(12) United States Patent
Zhao et al.

(10) Patent No.: US 10,908,965 B2
(45) Date of Patent: Feb. 2, 2021

(54) METHOD, APPARATUS, AND COMPUTER PROGRAM PRODUCT FOR PROCESSING COMPUTING TASK

(71) Applicant: EMC IP Holding Company LLC, Hopkinton, MA (US)

(72) Inventors: Junping Zhao, Beijing (CN); Kun Wang, Beijing (CN); Jinpeng Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 60 days.

(21) Appl. No.: 16/353,606

(22) Filed: Mar. 14, 2019

(65) Prior Publication Data
US 2019/0324816 A1    Oct. 24, 2019

(30) Foreign Application Priority Data
Apr. 20, 2018    (CN) .......................... 2018 1 0361441

(51) Int. Cl.
*G06F 9/50*    (2006.01)
*H04L 12/911*    (2013.01)
*H04L 12/919*    (2013.01)

(52) U.S. Cl.
CPC .......... *G06F 9/5038* (2013.01); *G06F 9/5072* (2013.01); *H04L 47/765* (2013.01);
(Continued)

(58) Field of Classification Search
CPC ....... G06F 9/5038; G06F 9/5072; H04L 47/70
(Continued)

(56) References Cited

U.S. PATENT DOCUMENTS

| 5,408,663 A | * | 4/1995 | Miller | ................... | G06Q 10/06 718/104 |
| 5,517,566 A | * | 5/1996 | Smith | ..................... | H04M 3/51 379/265.03 |

(Continued)

OTHER PUBLICATIONS

Ni, Lina, et al. "Resource allocation strategy in fog computing based on priced timed petri nets." IEEE Internet of Things Journal 4.5 (2017): pp. 1216-1228. (Year: 2017).*

(Continued)

*Primary Examiner* — Satish Rampuria
(74) *Attorney, Agent, or Firm* — Ryan, Mason & Lewis, LLP

(57) ABSTRACT

Implementations of the present disclosure relate to a method, apparatus and computer program product for processing a computing task. According to one example implementation of the present disclosure, there is provided a method for processing a computing task, comprising: in response to usage of multiple computing resources indicating that at least one part of computing resources among the multiple computing resources are used, determining a direction of a communication ring between the at least one part of computing resources; in response to receiving a request for processing the computing task, determining the number of computing resources associated with the request; and based on the usage and the direction of the communication ring, selecting from the multiple computing resources a sequence of computing resources which satisfy the number to process the computing task. Other example implementations include an apparatus for processing a computing task and a computer program product thereof.

20 Claims, 9 Drawing Sheets

(52) U.S. Cl.
CPC ............ *H04L 47/78* (2013.01); *H04L 47/821* (2013.01); *H04L 47/829* (2013.01)

(58) Field of Classification Search
USPC ...................................................... 718/1–108
See application file for complete search history.

(56) References Cited

U.S. PATENT DOCUMENTS

| | | | | |
|---|---|---|---|---|
| 5,838,968 | A | * | 11/1998 | Culbert ................. G06F 9/5011 718/104 |
| 10,657,061 | B1 | * | 5/2020 | Marriner ............. H04L 41/0806 |
| 2004/0160446 | A1 | * | 8/2004 | Gosalia ................ G06F 9/5038 345/503 |

OTHER PUBLICATIONS

Kumar, Karthik, et al. "Resource allocation for real-time tasks using cloud computing." 2011 Proceedings of 20th International Conference on Computer Communications and Networks (ICCCN). IEEE, 2011.pp. 1-7 (Year: 2011).*

Hong, Bo, and Viktor K. Prasanna. "Distributed adaptive task allocation in heterogeneous computing environments to maximize throughput." 18th International Parallel and Distributed Processing Symposium, 2004. Proceedings.. IEEE, 2004.pp. 1-10 (Year: 2004).*

Wang, Juan, and Di Li. "Task scheduling based on a hybrid heuristic algorithm for smart production line with fog computing." Sensors 19.5 (2019): pp. 1-18 (Year: 2019).*

Kaur, Shaminder, and Amandeep Verma. "An efficient approach to genetic algorithm for task scheduling in cloud computing environment." International Journal of Information Technology and Computer Science (IJITCS) 4.10 (2012): pp. 74-79 (Year: 2012).*

Yang, Chao, et al. "Efficient mobility-aware task offloading for vehicular edge computing networks." IEEE Access 7 (2019): pp. 26652-26664. (Year: 2019).*

* cited by examiner

US 10,908,965 B2

METHOD, APPARATUS, AND COMPUTER PROGRAM PRODUCT FOR PROCESSING COMPUTING TASK

RELATED APPLICATION(S)

The present application claims priority to Chinese Patent Application No. 201810361441.2, filed Apr. 20, 2018, and entitled "Method, Apparatus, and Computer Program Product for Processing Computing Task," which is incorporated by reference herein in its entirety.

FIELD

Implementations of the present disclosure generally relate to a computing system comprising dedicated processing resources, and more specifically, to a method, apparatus and computer program product for processing a computing task.

BACKGROUND

Applications on a client may be designed to complete various processing or analyzing tasks using computing resources, such as processing and storage resources. As the requirements and complexity of the tasks such as machine learning, deep learning, and data mining continuously grow, such tasks require large and/or variable amounts of computing resources to satisfy operations of the corresponding applications. This may be fulfilled by a machine or system having multiple dedicated processing resources, where the application may be scheduled to operate on one or more dedicated processing resources of the machine or system. For example, a cloud-based computing system has already been developed, and this computing system comprises a machine having one or more dedicated processing resources. Different clients may rent computing resources (for example, dedicated processing resources) of the system as required to operate their own applications.

With the development of computer technologies, there is an increasing variety of computing resources, and computing resources are no longer limited to traditional ones like central processing units. For example, the computing capabilities of graphics processing units (GPUs) are becoming increasingly strong. GPUs are particularly suitable to execute computing tasks in deep learning, high performance computing, machine learning and so on by virtue of their distinctive properties. However, for ordinary client devices and conventional cloud computing devices, their GPUs are rather limited in performance and lack a high performance processing capability. At this point, how to process a computing task using (e.g. remotely) the computing capability of a GPU of another device becomes a focus of research.

However, some existing technical solutions fail to make sufficient and effective use of the processing capability of remote computing resources (e.g. computing resources in a computing resource pool), but idleness or workload unbalance will arise in the resource pool. Therefore, it is desirable to provide a technical solution for easily and effectively processing a computing task using multiple computing resources in the resource pool.

SUMMARY

Implementations of the present disclosure provide a method, device and corresponding computer readable medium for processing a computing task.

According to a first aspect of the present disclosure, there is provided a method for processing a computing task, comprising: in response to usage of multiple computing resources indicating that at least one part of computing resources among the multiple computing resources are used, determining a direction of a communication ring between the at least one part of computing resources; in response to receiving a request for processing the computing task, determining the number of computing resources associated with the request; and based on the usage and the direction of the communication ring, selecting from the multiple computing resources a sequence of computing resources which satisfy the number to process the computing task.

According to a second aspect of the present disclosure, there is provided an apparatus for processing a computing task, comprising: at least one processor; and a memory coupled to the at least one processor, the memory having instructions stored thereon, the instructions, when executed by the at least one processor, causing the apparatus to perform acts comprising: in response to usage of multiple computing resources indicating that at least one part of computing resources among the multiple computing resources are used, determining a direction of a communication ring between the at least one part of computing resources; in response to receiving a request for processing the computing task, determining the number of computing resources associated with the request; and based on the usage and the direction of the communication ring, selecting from the multiple computing resources a sequence of computing resources which satisfy the number to process the computing task. The memory in some embodiments comprises a volatile memory.

According to a third aspect of the present disclosure, there is provided a computer program product. The computer program product is tangibly stored on a computer readable medium and comprises machine executable instructions which, when executed, cause the machine to implement a method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example implementations of the present disclosure with reference to the accompanying drawings, the above and other objectives, features, and advantages of the present disclosure will become more apparent, wherein the same reference sign usually refers to the same component in the example implementations of the present disclosure.

DETAILED DESCRIPTION

The preferred implementations of the present disclosure will be described in more detail with reference to the drawings. Although the drawings illustrate the preferred implementations of the present disclosure, it should be appreciated that the present disclosure may be implemented in various manners and should not be limited to the implementations explained herein. On the contrary, the implementations are provided to make the present disclosure more thorough and complete and to fully convey the scope of the present disclosure to those skilled in the art.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first," "second" and so on may refer to same or different objects. The following text also may comprise other explicit and implicit definitions.

As described above, dedicated processing resources may be provided locally at the client or by a remote machine or system. In some examples, a cloud-based computing system may be deployed, which comprises a plurality of machines having one or more dedicated processing resources. The dedicated processing resources of the computing system may be utilized by different clients based on their needs to dispatch the corresponding applications to operate on available dedicated processing resources.

Figure 1:
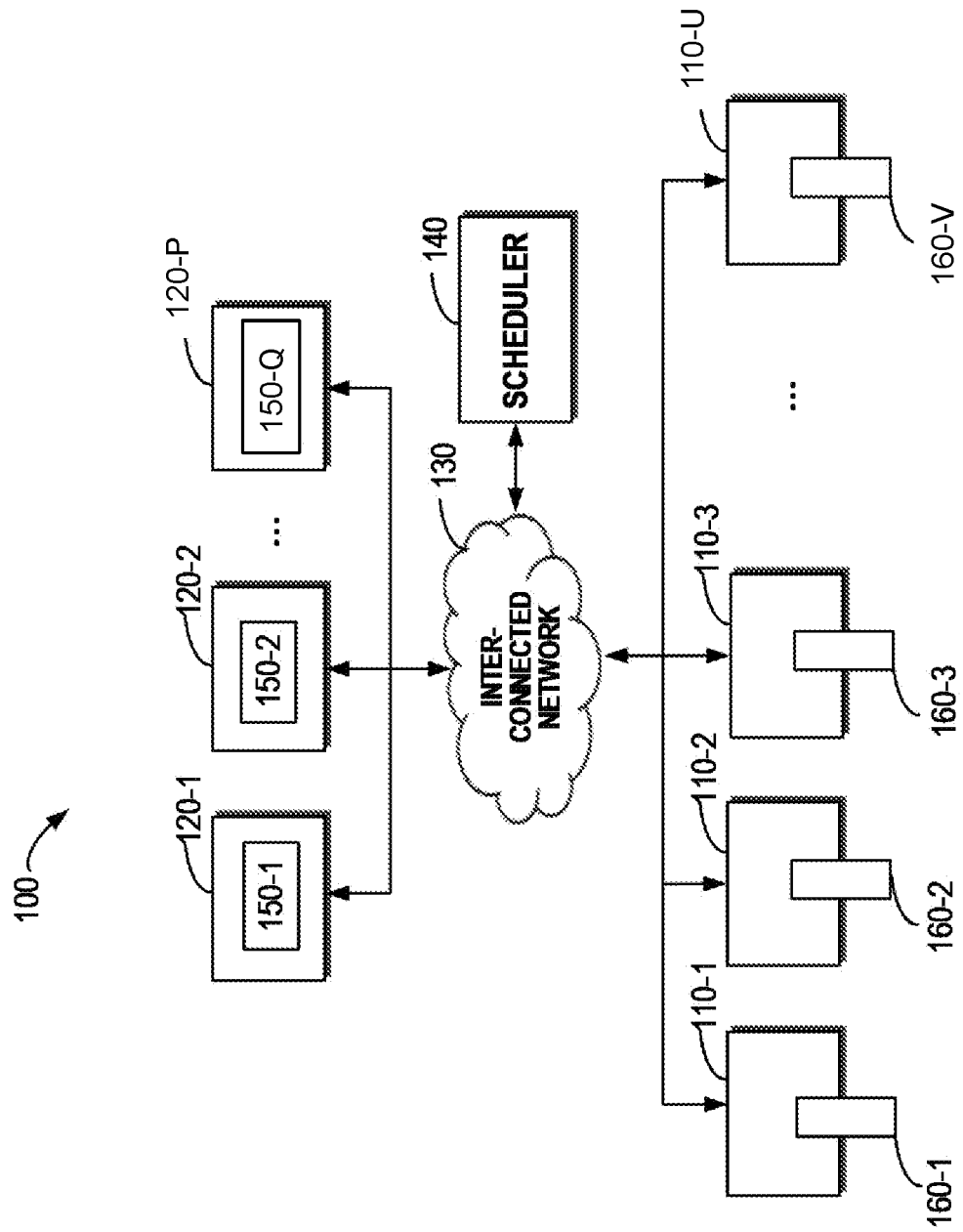
FIG. 1 schematically shows a block diagram of an example computing system in which some implementations of the present disclosure may be implemented.

FIG. 1 is a schematic diagram illustrating an example computing system 100 in which implementations of the present disclosure may be implemented. A plurality of servers for running applications, comprising server 110-1, server 110-2, server 110-3, . . . , server 110-U (hereinafter collectively referred to as server 110, wherein U is a natural number greater than 1), is deployed in the computing system 100. The computing system 100 further comprises a dedicated processing resource 160-1, a dedicated processing resource 160-2, a dedicated processing resource 160-3, . . . , a dedicated processing resource 160-V (hereinafter collectively referred to as a dedicated processing resource 160, wherein V is a natural number greater than 1). Each server 110 has one or more dedicated processing resources 160.

In the example of FIG. 1, the server 110-1 has the dedicated processing resource 160-1, the server 110-2 has the dedicated processing resource 160-2, the server 110-3 has the dedicated processing resource 160-3, and the server 110-U has the dedicated processing resource 160-V. It will be understood that each server is not limited to have only one computing resource, but one server may have one or more computing resources. Therefore, here the value of U may not equal that of V. Examples of the dedicated processing resource 160 may comprise, but are not limited to, a Graphics Processing Unit (GPU), a Field Programmable Gate Array (FPGA), or the like. For the sake of discussion, some implementations will take GPUs as the example of the dedicated processing resources. In addition to the dedicated processing resource 160, the server 110 may further comprise, for example, one or more general processing units such as a central processing unit (CPU) (not shown).

FIG. 1 further illustrates a plurality of clients 120-1, 120-2, . . . , 120-P (hereinafter collectively or individually referred to as a client 120, wherein P is a natural number greater than 1) respectively having applications 150-1, 150-2, . . . , 150-Q (hereinafter collectively referred to as an application 150, wherein Q is a natural number greater than 1) to run. The application 150 may be any application running on the machine, and the application may be designed to perform corresponding data processing or analyzing tasks. As an example, the application 150 may perform data processing or analyzing tasks associated with high performance computing (HPC), machine learning (ML) or deep learning (DL), and artificial intelligence (AI), and/or the like. It will be appreciated that each client is not limited to have only one application, but one client may have one or more applications. Therefore, here the value of P may not equal that of Q.

To quickly and efficiently run these applications and/or save local processing resources, the client 120 may request the dedicated processing resource 160 of the server 110 to run these applications 150. In such an implementation, the client 120 may be connected via an interconnected network 130 to one or more servers 110 and hand over the application 150 to be run by one or more dedicated processing resources 160 of the server 110. The interconnected network 130 may support different types of wired or wireless connections based on various network transmission techniques, for example, remote direct memory access (RDMA), transmission control protocol (TCP) or the like, depending on interfaces supported by the client 120, the server 110 and/or the dedicated processing resource 160.

It should be understood that the device and/or arrangement as shown in FIG. 1 is provided as an example only. In other examples, the computing system 100 may comprise any suitable number of servers 110 and clients 120. Each server 110 may be mounted with any suitable number of dedicated processing resources 160 and each client 120 may have a plurality of applications 150 to run. In addition, a scheduler 140, although separately shown, may be implemented by other devices independent of the server 110 in the practical application, or may be implemented at least in part on one or more servers 110.

For clarity and conciseness of description, example implementations of the present disclosure will be described in detail by mainly taking the GPU kernel as an example. It is known that GPU, as a dedicated processor, has strong computing capability due to a large amount of kernels and high-bandwidth memory. In the GPU hardware architecture, one GPU usually has a large amount of GPU kernels, such as 5120 or up to 10000 kernels. The GPU kernel, as a dedicated processing resource, is the most basic processing unit, which is also known as a stream processor (SP). Instructions and tasks are eventually processed on the GPU kernel. A plurality of GPU kernels simultaneously execute the instructions to implement parallel computing of the GPU. A plurality of SPs, in addition to other resources such as registers and shared memory, may compose one stream multiprocessor (SM).

However, it should be understood that GPU is only an example dedicated processing resource, and shall not limit the scope of the present disclosure. Spirits and principles described herein may be applied to other dedicated processing resources, for example processing resources in an accelerator such as an FPGA currently known or to be developed in the future, without limiting to the GPU kernel only.

Figure 2A:
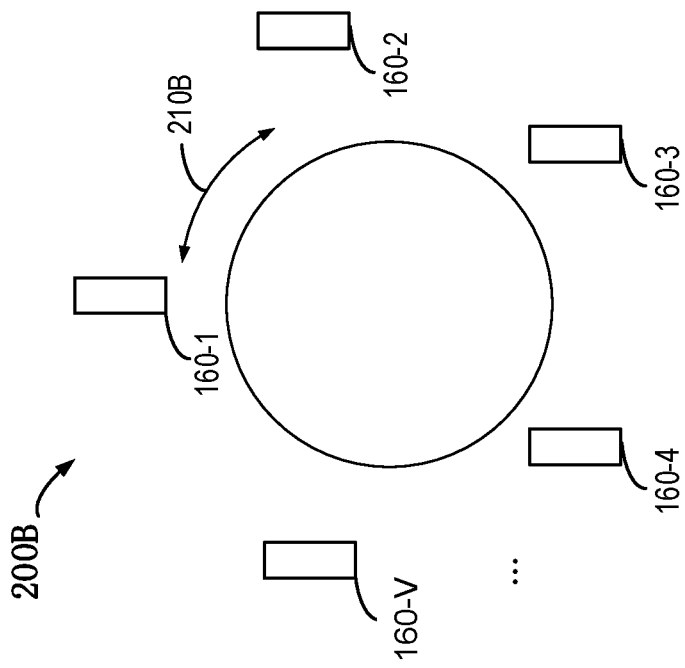
FIG. 2A schematically shows a block diagram of the process for processing a computing task according to one technical solution.

With the development of cloud computing, cloud architecture based technical solutions for processing a computing task have been proposed. For example, the application 150 at the client 120 may request the computing resource 160 in the server 110. It is noteworthy that due to the complexity of a computing task, multiple computing resources usually need to be called. FIG. 2A schematically shows a block diagram 200A of the process for processing a computing task according to one technical solution. As depicted, the computing task calls multiple computing resources (e.g. 160-1, 160-2, 160-3, 160-4, . . . , 160-V). Based on the existing protocol for GPU computing, the multiple computing resources 160-1 to 160-V may communicate with one another in a ring fashion along a direction shown by an arrow 210A as shown in FIG. 2A.

It will be appreciated that multiple approaches have been provided for communication between various computing resources. According to one approach, a ring communication path may be constructed using a communication channel between network cards. According to another approach, for some models of display cards, a ring communication path may be constructed using a dedicated communication channel between display cards. It will be appreciated that with the advancement of hardware devices, more and more hardware begins to support bidirectional communication. However, the existing communication ring between computing resources is constructed to only support one direction, which prevents rational use of computing resources and puts some computing resources in idle state.

In view of the drawbacks of the prior art, the present disclosure proposes a method for processing a computing task. In the method, usage of multiple computing resources in a computing resource pool may be monitored, and at least one part of computing resources which are used may be determined from the multiple computing resources. Subsequently, a direction of a communication ring between the at least one part of computing resources may be determined, and based on the usage and the direction of the communication ring, a group of computing resources which satisfy a desired number may be selected from the multiple computing resources to process a computing task.

Figure 2B:
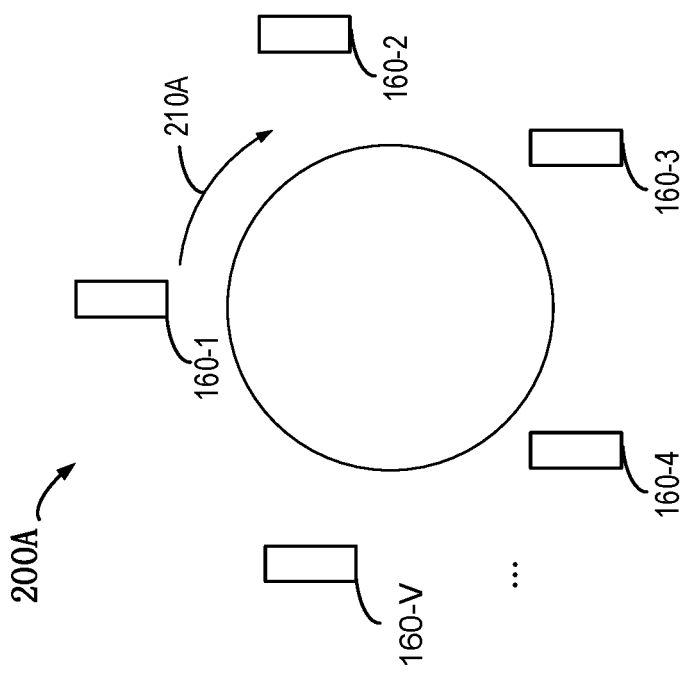
FIG. 2B schematically shows a block diagram of the process for processing a computing task according to one example implementation of the present disclosure.

FIG. 2B schematically shows a block diagram 200B of the process for processing a computing task according to one example implementation of the present disclosure. As depicted, a communication ring may be constructed in two directions shown by an arrow 210B. For example, a clockwise communication ring may be constructed between the computing resources 160-1, 160-2, 160-3 and 160-4. For another example, a counter-clockwise communication ring may be constructed between the computing resources 160-1, 160-V, 160-4 and 160-3. In this implementation, since the direction of the communication ring between used computing resources is taken into account, an available communication channel between computing resources may be put into better use. For example, computing resources may be selected, and a communication channel may be constructed in a direction opposite to a communication channel that has been taken.

Figure 3:
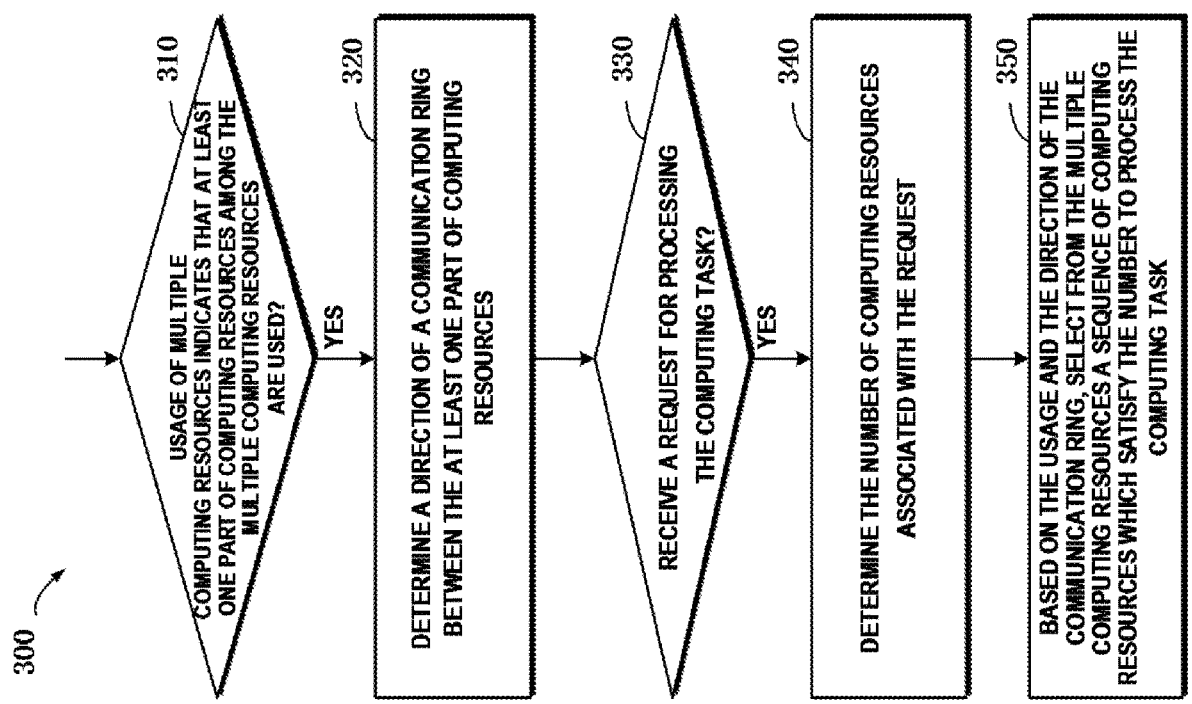
FIG. 3 schematically shows a flowchart of a method for processing a computing task according to one example implementation of the present disclosure.

According to one example implementation of the present disclosure, there is provided a method for processing a computing task. With reference to FIG. 3, description is presented to a flow of the method. FIG. 3 schematically shows a flowchart 300 of a method for processing a computing task according to one example implementation of the present disclosure. As depicted, at block 310, usage of multiple computing resources in a computing resource pool is monitored. The usage here may comprise, for example, whether a given computing resource among the multiple computing resources is being used or not. In one example implementation of the present disclosure, the usage may further comprise, for example, the start time when the given computing resource came into use, a computing task to which the given computing resource is allocated, etc. If the usage indicates at least one part of computing resources among the multiple computing resources are used, then at block 320, a direction of a communication ring between the at least one part of computing resources is determined. The direction here refers to a direction in which one node sends data to another node in the ring.

At block 330, it is determined whether a request for processing the computing task is received or not. If yes, then at block 340, the number of computing resources associated with the request is determined. The request may specify how many computing resources are needed for processing the computing task. At block 350, based on the usage and the direction of the communication ring, a group of computing resources satisfying the number may be selected from the multiple computing resources to process the computing task.

In this example implementation, consideration may be given to the used computing resources and the direction of the communication ring between the used computing resources, and further, unused computing resources may be selected as far as possible, and/or a sequence of computing resources for processing the computing task may be selected based on a direction opposite to the used communication ring.

Figure 4:
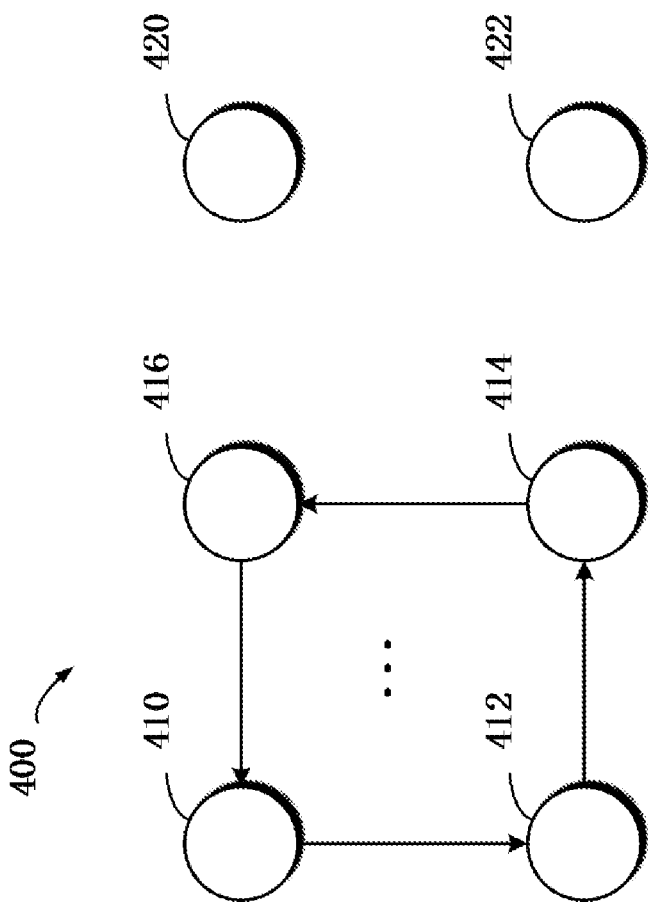
FIG. 4 schematically shows a block diagram of a topological relation according to one example implementation of the present disclosure.

With reference to FIG. 4, a detailed description is presented below to provide more details of the implementation of the present disclosure. FIG. 4 schematically shows a block diagram of a topological relation 400 according to one example implementation of the present disclosure. According to one example implementation of the present disclosure, the topological relation 400 as shown in FIG. 4 may be built, and a sequence of computing resources may be selected on the basis of the topological relation 400. Specifically, the topological relation 400 may be built on the basis of the usage and the direction of the communication ring. As shown in FIG. 4, nodes 410, 412, 414, 416, 420 and 422 in the topological relation 400 represent computing resources among the multiple computing resources, and a directed edge in the topological relation represents the communication path in the communication ring between the used computing resources. For example, computing resources represented by the nodes 410, 412, 414 and 416 have been allocated to processing the computing task, so there exist directed edges between these nodes as shown by arrows, and these directed edges form the communication ring. There is no directed edge between the nodes 420, 422 and other nodes, which means that computing resources represented by the nodes 420 and 422 have not been allocated.

Further, a sequence of the computing resources represented by nodes in a sequence may be selected on the basis of an overlap degree of a ring formed by the nodes in the sequence with an existing ring in the topological relation. In this example implementation, the overlap degree may represent a conflict degree (i.e. degree of resource competition) of a sequence of to-be-selected computing resources with the used computing resources in the resource pool to some degree. Therefore, a sequence of computing resources with the minimum conflict degree may be selected to process the computing task. In this manner, various computing resources in the resource pool may be allocated more effectively.

In the example as shown in FIG. 4, suppose 4 computing resources are needed in order to process a new computing task, and two sequences have been constructed as below:

Sequence 1: this sequence comprises computing resources represented by the nodes 410, 412, 414 and 416; and Sequence 2: this sequence comprises computing resources represented by the nodes 420, 422, 414 and 416.

As seen from a comparison between overlap degrees of the two sequences with the existing topological relation 400, the overlap degree of sequence 1 with the topological relation 400 is higher, while the overlap degree of sequence 2 with the topological relation 400 is lower, so sequence 2 may be selected preferentially.

According to one example implementation of the present disclosure, the overlap degree may be determined in many ways. For example, a node overlap degree of a node in the sequence with a node in the existing ring may be determined. The node overlap degree may indicate a workload of the computing resource 160 in the resource pool to some degree. The higher the node overlap degree, the higher a workload of a to-be-selected computing resource. For example, the overlap degree may be represented as "overlap" and "non-overlap." Continuing the above example, the nodes 410, 412, 414 and 416 in sequence 1 are already nodes in the ring in the topological relation 400, so sequence 1 may be considered to have an overlap with the existing ring. The nodes 414 and 416 in sequence 2 are already nodes in the ring in the topological relation 400, so sequence 2 has an overlap with the existing ring. In this implementation, a candidate sequence with a lower overlap degree may be selected as far as possible, so that computing nodes with lower workloads may be selected to serve the new computing task. Since only two nodes in sequence 2 have an overlap with the topological relation 400, sequence 2 may be selected preferentially.

According to one example implementation of the present disclosure, for a current node in the determined sequence of compute nodes, the node overlap degree may be determined on the basis of whether the current node has been allocated for processing another task or not. If it is determined the current node is comprised in the existing ring (i.e. has been allocated for processing another task), then the node overlap degree of the current node is increased. In this implementation, the node overlap degree may be measured by the number of overlapped nodes, at which point the node overlap degree of sequence 1 with the existing ring is 4 and the node overlap degree of sequence 2 with the existing ring is 2.

According to one example implementation of the present disclosure, an edge overlap degree of a directed edge between nodes in the determined sequence with a directed edge in the existing ring may further be determined. The edge overlap degree here may indicate a busy degree of communication between the various computing resources 160 in the resource pool to some degree. The higher the edge overlap degree, the busier the communication between to-be-selected computing resources. It will be appreciated here that the edge overlap degree takes into account the direction of an edge. Even if two directed edges have two identical endpoints, since their directions differ, the edge overlap degree between the two directed edges may be zero. In this manner, communication channels between the various computing resources 160 in the resource pool may be put into full utilization.

According to one example implementation of the present disclosure, the overlap degree may be determined on the basis of the node overlap degree and the edge overlap degree. In this example implementation, by taking into account workloads of computing resources and busy degrees of communication channels, idle computing resources in the resource pool may be selected to process a newly received computing task as far as possible.

In one simple implementation, the node overlap degree may be determined on the basis of the number of computing tasks that are being processed by the current node. For example, if the current compute node has been allocated for processing two computing tasks (i.e. in two rings), then the node overlap degree may be set to 2. In another implementation, the node overlap degree may be determined on the basis of the amount of resources which are occupied when the current node is processing a given computing task.

In one example implementation of the present disclosure, the node overlap degree may further be determined on the basis of utilization rate of a computing resource represented by a node. For example, suppose 10% of the computing resource in the current node has been allocated for processing one computing task, and 20% of the computing resource has been allocated for processing another computing task, then at this point the node overlap degree may be 1+2=3. Alternatively, the node overlap degree may be further calculated on the basis of another index. In this example implementation, a workload of a given computing resource may be determined quantitatively, and further a compute node with a lower workload may be selected for processing a new computing task.

According to one example implementation, with respect to a current directed edge between two nodes in the sequence, the edge overlap degree may be determined on the basis of whether a communication channel corresponding to the current directed edge has been occupied or not. For example, if the current directed edge has been occupied (i.e. comprised in the existing ring), then an edge overlap degree of the current directed edge may be increased. In one simple implementation, the edge overlap degree may be determined with respect to the number of computing tasks which the current directed edge is serving. For example, if the current directed edge has been allocated for processing two computing tasks (i.e. in two rings), then the edge overlap degree may be set to 2.

In another implementation, the node overlap degree may be determined with respect to the amount of resources which are occupied when the current node is processing a given computing task. Suppose 10% of the computing resource in the current node has been allocated for processing one computing task, and 20% of the computing resource has been allocated for processing another computing task, then at this point the node overlap degree may be 10%+

20%=30%. Alternatively, the node overlap degree may be further calculated on the basis of another index. In this example implementation, a workload of a given computing resource may be determined quantitatively, and further a compute node with a lower workload may be selected for processing a new computing task.

Figure 5:
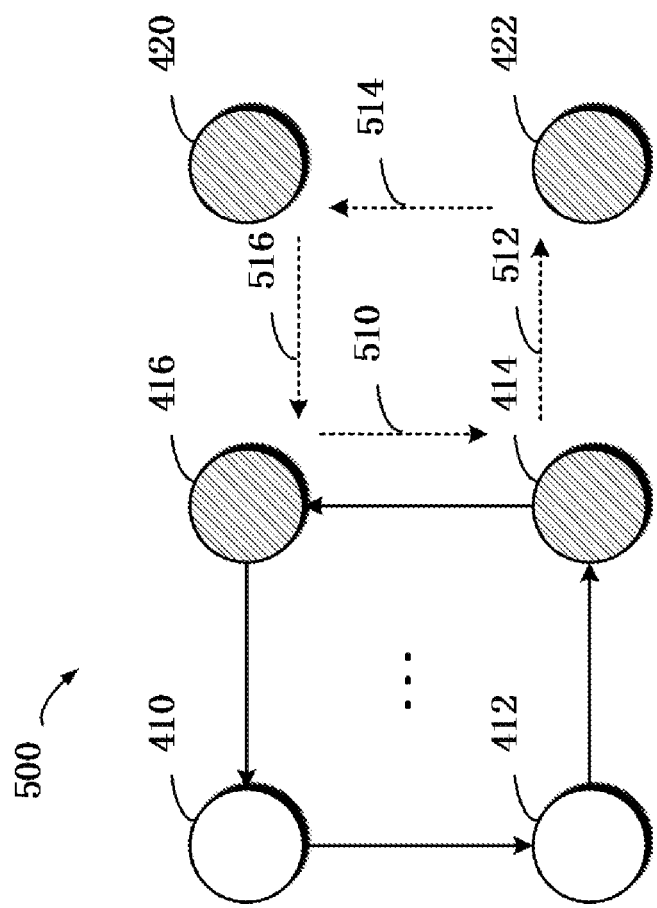
FIG. 5 schematically shows a block diagram for selecting a group of computing tasks according to a topological relation according to one example implementation of the present disclosure.

FIG. 5 schematically shows a block diagram 500 for selecting a group of computing resources on the basis of a topological relation according to one example implementation of the present disclosure. As depicted, the nodes 410, 412, 414 and 416 are comprised in an existing ring. Suppose the overlap degree may be measured by times that a current is used, then values associated with the nodes 410, 412, 414 and 416 may be 1, and values associated with the nodes 420 and 422 may be 0. At this point, the nodes 416, 414, 422 and 420 shown in shades may be selected, and a sequence may be constructed along directions as shown by arrows 510, 512, 514 and 516. It will be appreciated since a direction of communication between the nodes 416 and 414 in the newly constructed sequence is as shown by the arrow 510, and the direction is opposite to that of the existing communication ring, idle bandwidth in the resource pool may be utilized more efficiently.

According to one example implementation of the present disclosure, to describe in detail the frequency degree of communication between various nodes, bandwidth usage between various communication paths may further be checked. For example, communication bandwidth associated with a directed edge in the existing ring may be determined, and the edge overlap degree of the directed edge may be updated on the basis of the communication bandwidth. In this example implementation, usage of each path may be recorded more accurately, and further it is advantageous to select idler communication paths for building a communication ring.

According to one example implementation of the present disclosure, the edge overlap degree of the directed edge may be updated on the basis of the communication bandwidth. For example, regarding a current directed edge between two nodes in the sequence, the edge overlap degree is increased in response to reduction in communication bandwidth of a communication path represented by the current directed edge. In this example implementation, the edge overlap degree is inversely proportional to the communication bandwidth, so the edge overlap degree is increased as the communication bandwidth is reduced. Alternatively, the edge overlap degree may be further updated on the basis of available communication bandwidth, at which point the edge overlap degree is increased as the available bandwidth increases.

Figure 6:
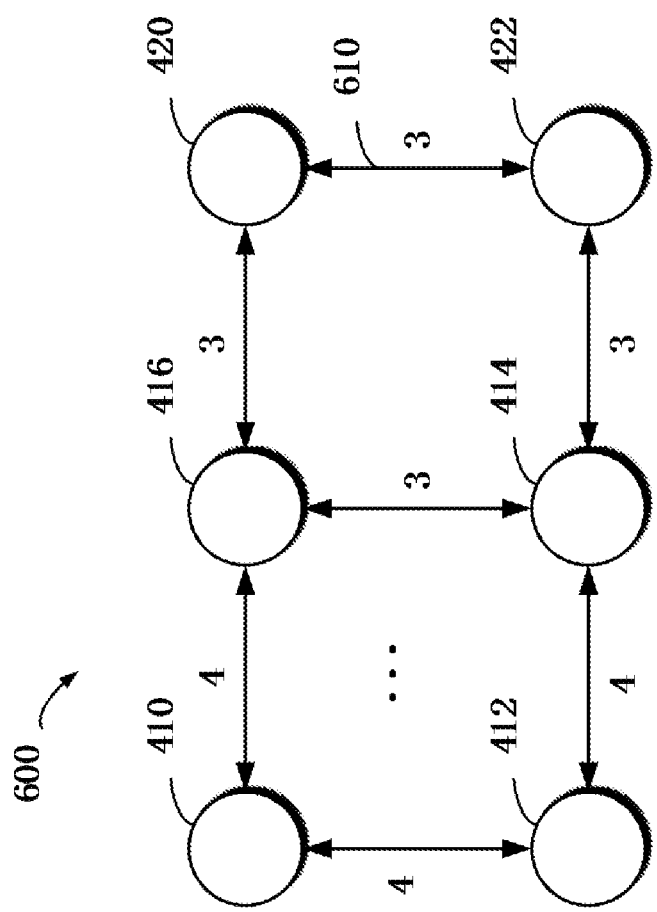
FIG. 6 schematically shows a block diagram of a topological relation according to one example implementation of the present disclosure.

FIG. 6 schematically shows a block diagram 600 of a topological relation according to one example implementation of the present disclosure. As depicted, the edge overlap degree may be indicated by times that a communication path represented by a directed edge is used. A number over a directed edge may denote an edge overlap degree associated with the directed edge. For example, the edge overlap degree of a directed edge represented by a bidirectional arrow 610 is 3, which means bandwidth loads along the two directions shown by the bidirectional arrow are both 3. It will be appreciated although FIG. 6 shows a circumstance where bandwidth loads along two directions are equal, in other examples bandwidth loads along two directions may be different. For example, a bandwidth load from the node 420 to the node 422 may be 3, whereas a bandwidth load from the node 422 to the node 420 may be 2.

As shown in FIG. 6, since the bandwidth loads of the two rings (clockwise and counter-clockwise) formed by the nodes 416, 414, 422 and 420 are equal (3), at this point a ring may be constructed by randomly selecting the clockwise direction or the counter-clockwise direction. In another example, suppose the bandwidth load of the clockwise ring is 3, while the bandwidth load of the counter-clockwise ring is 2, then a ring may be constructed using the nodes 416, 414, 422 and 420 in the counter-clockwise direction.

According to one example implementation of the present disclosure, a ring may be constructed on the basis of the above described node overlap degree and edge overlap degree. For example, a sequence with a lower overlap degree with the existing ring may be selected from the topological relation. First of all, multiple candidate sequences satisfying a requested number of computing resources may be constructed, and next an overlap degree of each sequence with the existing ring may be determined by means of the above method. Further, computing resources in a sequence with a lower overlap degree may be selected for processing a new computing task.

According to one example implementation of the present disclosure, the candidate sequence may be constructed in various ways. For example, first computing resources with lower workloads may be selected from the resource pool; next, bandwidths of communication lines between the selected computing resources may be ranked; and then, a communication ring may be constructed by selecting communication lines with lower utilization rate according to rankings. In this manner, it may be ensured that computing resources with lower workloads are first selected to serve a new computing task.

According to one example implementation of the present disclosure, a weight may be set with respect to the node overlap degree and the edge overlap degree respectively, so as to construct a communication ring on the basis of a final overlap degree. For example, if a new computing task requires a higher computation amount, then a higher weight may be assigned to the node overlap degree. If the new computing task requires a lower computation amount, then a lower weight may be assigned to the node overlap degree. For another example, if the new computing task requires a higher communication bandwidth, then a higher weight may be assigned to the edge overlap degree; if the new computing task requires a lower communication bandwidth, then a lower weight may be assigned to the edge overlap degree.

In the present disclosure, the candidate sequence may be constructed in various ways. For example, first computing resources with lower workloads may be selected from the resource pool; next, bandwidths of communication lines between the selected computing resources may be ranked; and then, a communication ring may be constructed by selecting communication lines with lower utilization rates according to rankings. In this manner, it may be ensured that computing resources with lower workloads are first selected to serve a new computing task. Based thereon, communication lines with lower utilization rates may further be selected to construct a communication ring, so as to make full use of computing capacities of computing resources in the resource pool and communication bandwidths between the computing resources.

For another example, first communication lines with lower utilization rates may be selected from the resource pool; next, workloads of computing resources associated with these communication lines may be ranked; and then, a communication ring may be constructed by selecting computing resources with lower workloads according to rankings. In this manner, it may be ensured that the newly constructed communication ring has higher communication efficiency. Based thereon, by selecting computing resources with lower workloads, it may be ensured that computing capacities of computing resources in the resource pool and communication bandwidths between the computing resources may be utilized sufficiently as far as possible.

Figure 7:
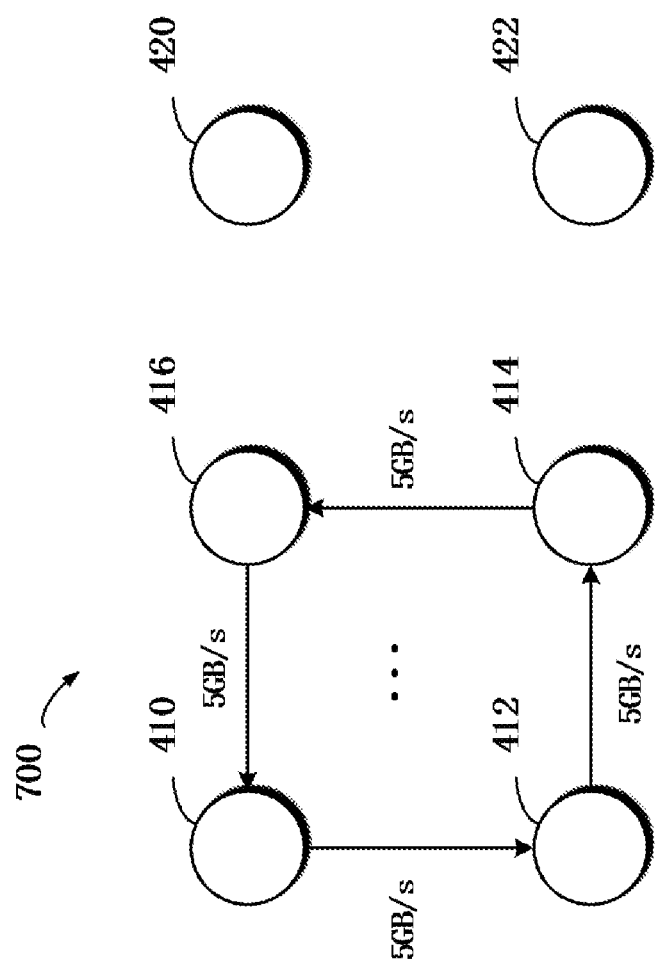
FIG. 7 schematically shows a block diagram of a topological relation according to one example implementation of the present disclosure.

FIG. 7 schematically shows a block diagram 700 of a topological relation according to one example implementation of the present disclosure. Suppose workloads of computing resources represented by the nodes 410, 412, 414 and 416 are 50%, and workloads at other nodes are 0. The used bandwidth of the counter-clockwise ring between the nodes 410, 412, 414 and 416 is 5 GB/s, and the used bandwidth of other path is 0 GB/s. First, the node overlap degree and the edge overlap degree may be normalized, and then the final overlap degree may be calculated on the basis of respective weights for the node overlap degree and the edge overlap degree.

Suppose the maximum bandwidth between various nodes is 10 GB/s, then the edge overlap degree of the counter-clockwise ring between the nodes 410, 412, 414 and 416 may be calculated from: 5/10=50%. Suppose weights for the node overlap degree and the edge overlap degree are both 0.5, then the overlap degree of the sequence may be calculated as:

Overlap degree=node weight*(node overlap degree)+
edge weight*(edge overlap degree)      Formula 1

Note although formula 1 shows a specific formula for determining the overlap degree on the basis of multiplication and addition, in other examples the overlap degree may be further determined on the basis of other computation. For example, the overlap degree may be calculated using formula 2 or other formulas.

Overlap degree=node weight*(node overlap degree)
*edge weight*(edge overlap degree)      Formula 2

Continuing the Example of FIG. 7, Based on Formula 1, Overlap Degree 1 of Sequence 1 May be Calculated as:

$$\text{Overlap degree } 1 = 0.5*(50\% + 50\% + 50\% + 50\%) +$$
$$0.5*(50\% + 50\% + 50\% + 50\%)$$
$$= 1 + 1 = 2$$

Based on formula 2, overlap degree 2 of sequence 2 may be calculated as:

$$\text{Overlap degree } 2 = 0.5*(50\% + 50\% + 0 + 0) + 0.5*(0 + 0 + 0 + 0)$$
$$= 0.5$$

As seen from the above calculation, overlap degree 1 is larger than overlap degree 2, so computing resources corresponding to sequence 2 may be selected preferentially, and a communication ring may be constructed in the direction of sequence 2. At this point, the communication ring may be constructed on the basis of computing resources represented by the nodes 420, 422, 414 and 416.

According to one example implementation of the present disclosure, the topological relation may be updated in response to usage of the multiple computing resources in the computing resource pool changing. It will be appreciated since usage of the computing resources in the resource pool is updated constantly, the topological relation may be updated constantly on the basis of the latest usage. For example, the topological relation may be updated at predefined time intervals. According to one example implementation of the present disclosure, the used bandwidth may be monitored once per second or at another frequency. For another example, the following information may further be monitored once per second or at another frequency:

(1) ID of a computing task that is currently running in the resource pool, comprising, for example, name, source or other information.

(2) List of invoked computing resources in the resource pool, which list may record a sequence of communication rings established by invoked computing resources. For example, regarding the resource pool comprising computing resources as shown in FIG. 7, the sequence may be expressed as: 410-412-414-416. For another example, the sequence may further be represented by ports and addresses of various computing resources. For still another example, the sequence may be represented by unique identifiers of various computing resources.

(3) Time when a computing resource in the resource pool is invoked, comprising, for example, start time and end time when the computing resource is allocated for processing a given computing task.

(4) State that a computing resource in the resource pool is involved, which may be, for example, any one of: initiation, running, success, failure, etc.

According to one example implementation of the present disclosure, the multiple computing resources are multiple GPUs. A ring communication channel may be established between a group of GPUs on the basis of an AllReduce rule, and subsequently to-be-processed data are allocated to the group of GPUs and processed by the same. The AllReduce rule is a rule of communication between GPUs. Those skilled in the art may obtain more specific details based on the definition of the rule.

Figure 8:
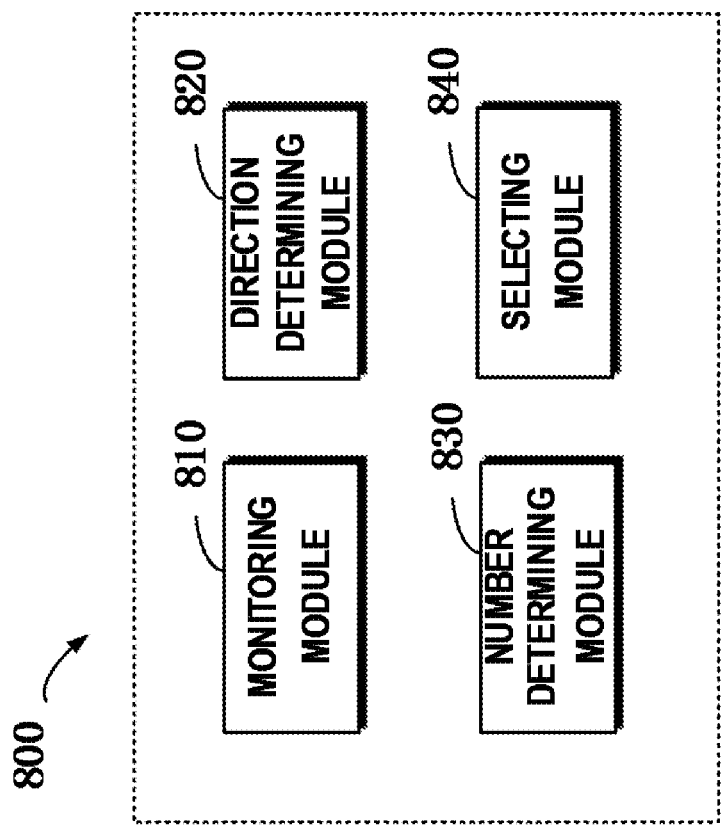
FIG. 8 schematically shows a block diagram of an apparatus for processing a computing task according to one example implementation of the present disclosure.

Examples of the method according to the present disclosure have been described in detail with reference to FIGS. 2B to 7, a detailed description is presented below to a corresponding apparatus with reference to FIG. 8. FIG. 8 schematically shows a block diagram of an apparatus 800 for processing a computing task according to one example implementation of the present disclosure. The apparatus 800 comprises: a monitoring module 810 configured to monitor usage of multiple computing resources; a direction determining module 820 configured to, in response to usage of multiple computing resources indicating that at least one part of computing resources among the multiple computing resources are used, determine a direction of a communication ring between the at least one part of computing resources; a number determining module 830 configured to, in response to receiving a request for processing the computing task, determine the number of computing resources associated with the request; and a selecting module 840 configured to, based on the usage and the direction of the communication ring, select from the multiple computing resources a sequence of computing resources which satisfy the number to process the computing task. The apparatus 800 here may be configured to execute various steps in the method described above, which is not detailed.

Figure 9:
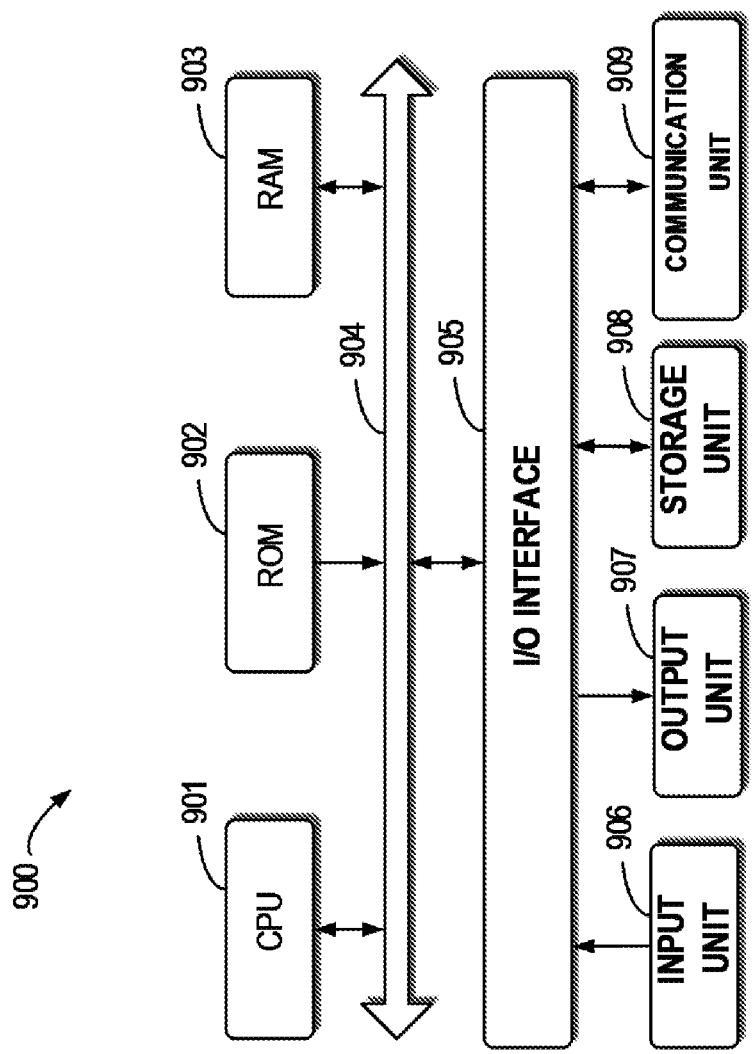
FIG. 9 schematically shows a block diagram of an apparatus for processing a computing task according to one example implementation of the present disclosure.

FIG. 9 schematically shows a block diagram of a device 900 for implementing the implementations of the present disclosure. As depicted, the device 900 comprises a central process unit (CPU) 901, which may execute various suitable actions and processing based on the computer program instructions stored in the read-only memory (ROM) 902 or computer program instructions loaded in the random-access memory (RAM) 903 from a storage unit 908. The RAM 903 may also store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 is connected to the I/O interface 905, comprising: an input unit 906, such as keyboard, mouse and the like; an output unit 907, e.g., various kinds of displays and loudspeakers etc.; a storage unit 908, such as magnetic disk and optical disk etc.; and a communication unit 909, such as network card, modem, wireless transceiver and the like. The communication unit 909 allows the device 900 to exchange information/data with other devices via the computer network, such as Internet, and/or various telecommunication networks.

The above described each procedure and processing, such as the method 300, may also be executed by the processing unit 901. For example, in some implementations, the method 300 may be implemented as a computer software program tangibly comprised in the machine-readable medium, e.g., the storage unit 908. In some implementations, the computer program may be partially or fully loaded and/or mounted to the device 900 via ROM 902 and/or the communication unit 909. When the computer program is loaded to the RAM 903 and executed by the CPU 901, one or more steps of the above described method 300 may be implemented. Alternatively, in other implementations, the CPU 901 also may be configured in other suitable manners to realize the above procedure/method.

According to one example implementation of the present disclosure, there is provided an apparatus for processing a computing task, comprising: at least one processor; and a memory coupled to the at least one processor, the memory having instructions stored thereon, the instructions, when executed by the at least one processor, causing the apparatus to perform acts comprising: in response to usage of multiple computing resources indicating that at least one part of computing resources among the multiple computing resources are used, determining a direction of a communication ring between the at least one part of computing resources; in response to receiving a request for processing the computing task, determining the number of computing resources associated with the request; and based on the usage and the direction of the communication ring, selecting from the multiple computing resources a sequence of computing resources which satisfy the number to process the computing task.

According to one example implementation of the present disclosure, selecting the sequence of computing resources based on the usage and the direction of the communication ring comprises: establishing a topological relation based on the usage and the direction of the communication ring, a node in the topological relation representing a computing resource among the multiple computing resources, and a directed edge in the topological relation representing a communication path in the communication ring between the at least one part of computing resources; based on an overlap degree of a ring formed by nodes in a sequence with an existing ring in the topological relation, selecting the sequence of computing resources represented by nodes in the sequence.

According to one example implementation of the present disclosure, the acts further comprise determining an overlap degree. Here determining the overlap degree comprises: determining a node overlap degree of a node in the sequence with a node in the existing ring, and an edge overlap degree of a directed edge between nodes in the sequence with a directed edge in the existing ring; and determining the overlap degree based on the node overlap degree and the edge overlap degree.

According to one example implementation of the present disclosure, determining the node overlap degree comprises: with respect to a current node in the sequence, in response to determining that the current node is comprised in the existing ring, increasing a node overlap degree of the current node.

According to one example implementation of the present disclosure, determining the edge overlap degree comprises: with respect to a current directed edge between two nodes in the sequence, in response to determining that the current directed edge is comprised in the existing ring, increasing an edge overlap degree of the current directed edge.

According to one example implementation of the present disclosure, the acts further comprise: determining a communication bandwidth associated with a directed edge in the existing ring; and updating the edge overlap degree of the directed edge based on the communication bandwidth.

According to one example implementation of the present disclosure, updating the edge overlap degree of the directed edge based on the communication bandwidth comprises: with respect to a current directed edge between two nodes in the sequence, in response to determining that a communication bandwidth of a communication path represented by the current directed edge is reduced, increasing the edge overlap degree.

According to one example implementation of the present disclosure, a sequence having a lower overlap degree with the existing ring is selected from the topological relation.

According to one example implementation of the present disclosure, in response to usage of the multiple computing resources changing, the topological relation is updated.

According to one example implementation of the present disclosure, the multiple computing resources are multiple GPUs, and the method further comprises: establishing a ring communication channel among the group of GPUs based on an AllReduce rule; allocating to the group of GPUs data that is to be processed; and processing by the group of GPUs the data that is to be processed.

According to one example implementation of the present disclosure, there is provided a computer program product. The computer program product is tangibly stored on a computer readable medium and comprises machine executable instructions which, when executed, cause the machine to implement the method according to the present disclosure.

According to one example implementation of the present disclosure, there is provided a computer readable medium. The computer readable medium is stored with machine executable instructions thereon, the machine executable instructions, when executed by at least one processor, causing the at least one processor to implement the method according to the present disclosure.

The present disclosure may be a method, device, system and/or computer program product. The computer program product may comprise a computer-readable storage medium, on which the computer-readable program instructions for executing various aspects of the present disclosure are loaded.

The computer-readable storage medium may be a tangible apparatus that maintains and stores instructions utilized by the instruction executing apparatuses. The computer-readable storage medium may be, but is not limited to, an electrical storage device, magnetic storage device, optical storage device, electromagnetic storage device, semiconductor storage device or any appropriate combinations of the above. More concrete examples of the computer-readable storage medium (non-exhaustive list) comprise: portable computer disk, hard disk, RAM, ROM, erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction may be downloaded from the computer-readable storage medium to each computing/processing device, or to an external computer or external storage via Internet, local area network, wide area network and/or wireless network. The network may comprise copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions may be implemented fully on the user computer, partially on the user computer, as an independent software package, partially on the user computer and partially on the remote computer, or completely on the remote computer or server. In the case where a remote computer is involved, the remote computer may be connected to the user computer via any type of networks, comprising local area network (LAN) and wide area network (WAN), or to the external computer (e.g., connected via Internet using the Internet service provider). In some implementations, state information of the computer-readable program instructions is used to customize an electronic circuit, e.g., a programmable logic circuit, an FPGA or a programmable logic array (PLA). The electronic circuit may execute computer-readable program instructions to implement various aspects of the present disclosure.

Various aspects of the present disclosure are described herein with reference to flow charts and/or block diagrams of methods, apparatus (systems) and computer program products according to implementations of the present disclosure. It should be understood that each block of the flow chart and/or block diagram and the combination of various blocks in the flow chart and/or block diagram may be implemented by computer-readable program instructions.

The computer-readable program instructions may be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, comprising instructions for implementing various aspects of the functions/actions stipulated in one or more blocks of the flow chart and/or block diagram.

The computer-readable program instructions may also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram may represent a module, a part of program segment or code, wherein the module and the part of program segment or code comprise one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order dependent on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, so as to enable those of ordinary skill in the art to understand implementations of the present disclosure.

What is claimed is:
1. A method for processing a computing task, comprising:
in response to usage of multiple computing resources indicating that at least one part of computing resources among the multiple computing resources are used, determining a direction of a communication ring between the at least one part of computing resources;

in response to receiving a request for processing the computing task, determining a number of computing resources associated with the request; and based on the usage and the direction of the communication ring, selecting from the multiple computing resources a sequence of computing resources which satisfy the number to process the computing task;

wherein selecting the sequence of computing resources based on the usage and the direction of the communication ring comprises:

establishing a topological relation based on the usage and the direction of the communication ring, a node in the topological relation representing a computing resource among the multiple computing resources, and a directed edge in the topological relation representing a communication path in the communication ring between the at least one part of computing resources; and based on an overlap degree for a plurality of nodes in a sequence with an existing ring in the topological relation, selecting the sequence of computing resources represented by the nodes in the sequence.

2. The method of claim 1, further comprising determining the overlap degree, comprising:

determining a node overlap degree of a node in the sequence with a node in the existing ring, and an edge overlap degree of a directed edge between nodes in the sequence with a directed edge in the existing ring; and determining the overlap degree based on the node overlap degree and the edge overlap degree.

3. The method of claim 2, wherein determining the node overlap degree comprises: with respect to a current node in the sequence, in response to determining that the current node is comprised in the existing ring, increasing a node overlap degree of the current node.

4. The method of claim 2, wherein determining the edge overlap degree comprises: with respect to a current directed edge between two nodes in the sequence, in response to determining that the current directed edge is comprised in the existing ring, increasing an edge overlap degree of the current directed edge.

5. The method of claim 2, further comprising:

determining a communication bandwidth associated with a directed edge in the existing ring; and updating the edge overlap degree of the directed edge based on the communication bandwidth.

6. The method of claim 5, wherein updating the edge overlap degree of the directed edge based on the communication bandwidth comprises: with respect to a current directed edge between two nodes in the sequence, in response to determining that a communication bandwidth of a communication path represented by the current directed edge is reduced, increasing the edge overlap degree.

7. The method of claim 2, further comprising: selecting from the topological relation a sequence having a lower overlap degree with the existing ring.

8. The method of claim 1, further comprising: updating the topological relation in response to the usage of the multiple computing resources changing.

9. The method of claim 1, wherein the multiple computing resources are multiple graphics processing units, and the method further comprises:

establishing a ring communication channel among the multiple graphics processing units based on an AllReduce rule;

allocating to the multiple graphics processing units data that is to be processed; and processing by the multiple graphics processing units the data that is to be processed.

10. An apparatus for processing a computing task, comprising:

at least one processor; and a memory coupled to the at least one processor and having instructions stored thereon, the instructions, when executed by the at least one processor, causing the device to perform acts comprising:

in response to usage of multiple computing resources indicating that at least one part of computing resources among the multiple computing resources are used, determining a direction of a communication ring between the at least one part of computing resources;

in response to receiving a request for processing the computing task, determining a number of computing resources associated with the request; and based on the usage and the direction of the communication ring, selecting from the multiple computing resources a sequence of computing resources which satisfy the number to process the computing task;

wherein selecting the sequence of computing resources based on the usage and the direction of the communication ring comprises:

establishing a topological relation based on the usage and the direction of the communication ring, a node in the topological relation representing a computing resource among the multiple computing resources, and a directed edge in the topological relation representing a communication path in the communication ring between the at least one part of computing resources; and based on an overlap degree for a plurality of nodes in a sequence with an existing ring in the topological relation, selecting the sequence of computing resources represented by the nodes in the sequence.

11. The apparatus of claim 10, further comprising determining the overlap degree, comprising:

determining a node overlap degree of a node in the sequence with a node in the existing ring, and an edge overlap degree of a directed edge between nodes in the sequence with a directed edge in the existing ring; and determining the overlap degree based on the node overlap degree and the edge overlap degree.

12. The apparatus of claim 11, wherein determining the node overlap degree comprises: with respect to a current node in the sequence, in response to determining that the current node is comprised in the existing ring, increasing a node overlap degree of the current node.

13. The apparatus of claim 11, wherein determining the edge overlap degree comprises: with respect to a current directed edge between two nodes in the sequence, in response to determining that the current directed edge is comprised in the existing ring, increasing an edge overlap degree of the current directed edge.

14. The apparatus of claim 11, the acts further comprising:

determining a communication bandwidth associated with a directed edge in the existing ring; and updating the edge overlap degree of the directed edge based on the communication bandwidth.

15. The apparatus of claim 14, wherein updating the edge overlap degree of the directed edge based on the communication bandwidth comprises: with respect to a current directed edge between two nodes in the sequence,
   in response to determining that a communication bandwidth of a communication path represented by the current directed edge is reduced, increasing the edge overlap degree.

16. The apparatus of claim 11, the acts further comprising: selecting from the topological relation a sequence having a lower overlap degree with the existing ring.

17. The apparatus of claim 10, wherein the multiple computing resources are multiple graphics processing units, and the method further comprises:
   establishing a ring communication channel among the multiple graphics processing units based on an AllReduce rule;
   allocating to the multiple graphics processing units data that is to be processed; and
   processing by the multiple graphics processing units the data that is to be processed.

18. A computer program product, tangibly stored on a computer readable medium and comprising machine executable instructions which, when executed, cause a machine to implement a method for processing a computing task, comprising:
   in response to usage of multiple computing resources indicating that at least one part of computing resources among the multiple computing resources are used, determining a direction of a communication ring between the at least one part of computing resources;
   in response to receiving a request for processing the computing task, determining a number of computing resources associated with the request; and
   based on the usage and the direction of the communication ring, selecting from the multiple computing resources a sequence of computing resources which satisfy the number to process the computing task;
   wherein selecting the sequence of computing resources based on the usage and the direction of the communication ring comprises:
   establishing a topological relation based on the usage and the direction of the communication ring, a node in the topological relation representing a computing resource among the multiple computing resources, and a directed edge in the topological relation representing a communication path in the communication ring between the at least one part of computing resources; and
   based on an overlap degree for a plurality of nodes in a sequence with an existing ring in the topological relation, selecting the sequence of computing resources represented by the nodes in the sequence.

19. The computer program product of 18, further comprising determining the overlap degree, comprising:
   determining a node overlap degree of a node in the sequence with a node in the existing ring, and an edge overlap degree of a directed edge between nodes in the sequence with a directed edge in the existing ring; and
   determining the overlap degree based on the node overlap degree and the edge overlap degree.

20. The computer program product of claim 19, wherein determining the node overlap degree comprises: with respect to a current node in the sequence,
   in response to determining that the current node is comprised in the existing ring, increasing a node overlap degree of the current node.

* * * * *